W. HALLINAN.
WHEEL.
APPLICATION FILED AUG. 30, 1911.
1,038,501.
Patented Sept. 10, 1912.
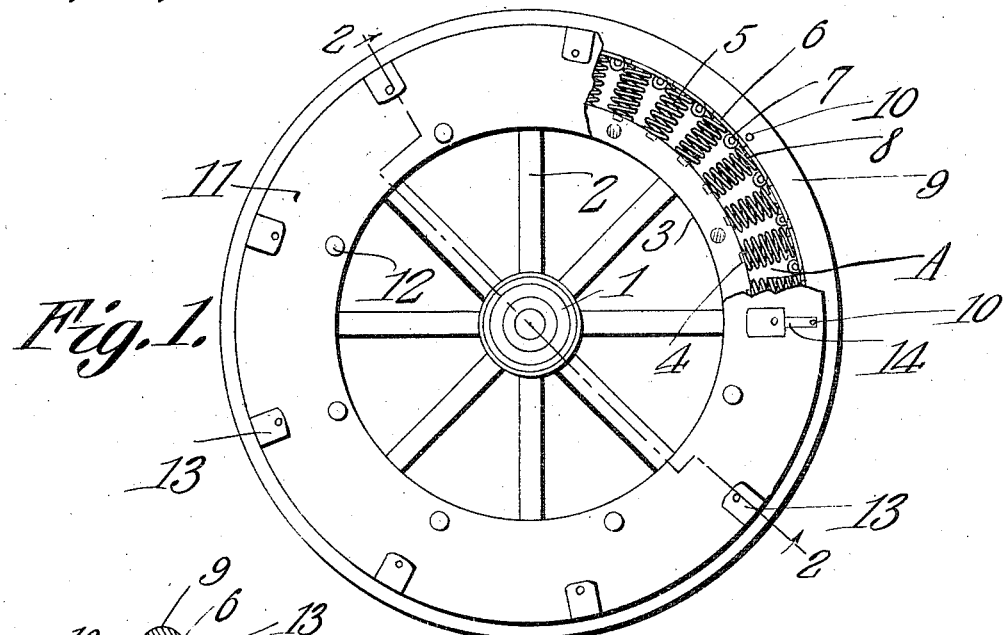
Fig. 1.
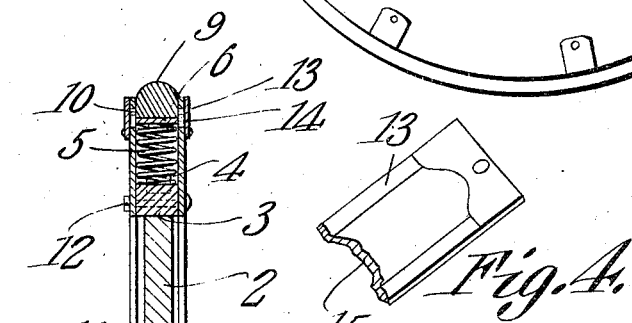
Fig. 4.
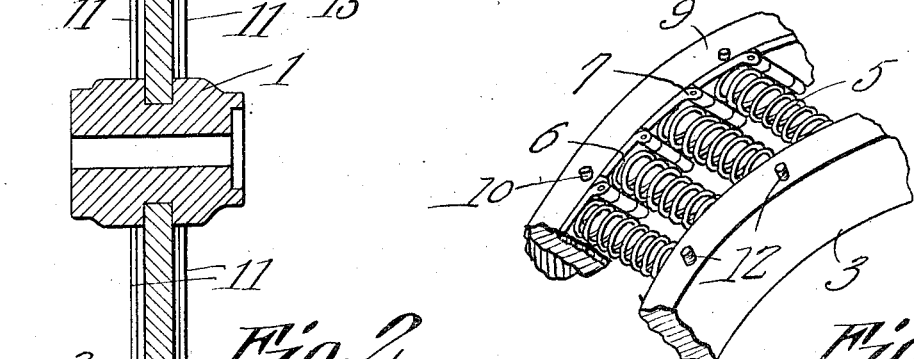
Fig. 2.
Fig. 3.
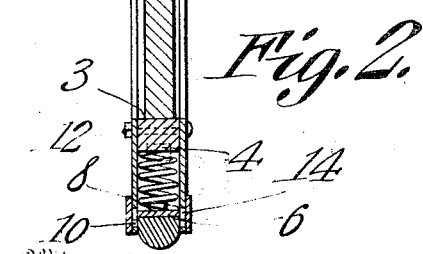
Witnesses
Inventor
William Hallinan.
By C. A. Snow & Co.
Attorneys

UNITED STATES PATENT OFFICE.

WILLIAM HALLINAN, OF GREENVILLE, KENTUCKY.

WHEEL.

1,038,501.      Specification of Letters Patent.      Patented Sept. 10, 1912.

Application filed August 30, 1911. Serial No. 646,873.

*To all whom it may concern:*

Be it known that I, WILLIAM HALLINAN, a citizen of the United States, residing at Greenville, in the county of Muhlenberg and State of Kentucky, have invented a new and useful Wheel, of which the following is a specification.

The present invention aims to provide novel means for supporting a tire resiliently, to provide novel means for preventing a creeping of the tire, and to provide novel means for preventing lateral movement of the tire.

With this and other objects in view this invention consists in the construction, combinations and arrangement of parts all as hereinafter more fully described, specifically claimed and illustrated in the accompanying drawings, wherein, Figure 1 is a side elevation of a wheel constructed in accordance with the invention, a part of the retaining plate being broken away. Fig. 2 is a section on the line 2—2 of Fig. 1. Fig. 3 is a perspective view of a portion of the felly, the view showing in detail my improved tire. Fig. 4 is a perspective view of the cover which is carried on the retaining plate.

Reference being had to the drawing, 1 indicates the hub of a wheel having the spokes 2 radiating therefrom to the felly 3. Arranged at regular intervals on the felly are lugs 4 which are seated in orifices cut in the outer face of the said felly. Spaced from the felly 3 by the springs 5, is a band 6, comprising a series of segments pivotally secured together by pins 7, each of said segments having on its under face, a lug 8 similar to the lug 4. The coil springs 5 are adapted to encircle the lugs 8 and 4 which are carried on the band and on the felly, respectively, and be firmly retained thereby.

Surrounding the band 6 is a tire 9 preferably constructed of rubber and adapted to come into direct contact with the ground. Extending through the tire at regular intervals adjacent the band 6 are the transverse pins, the pins protruding on each side of the tire and band and forming lugs 10 adapted to engage the side retaining plates 11. These retaining plates are rigidly secured to each side of the felly 3 by bolts 12 extended through the felly and the plates. A series of slots 14 are provided adjacent the periphery of the plates 11 and these slots are adapted to receive slidably the lugs 10 of the tire, thus permitting the tire to compress the springs 5. A cover 13 is pivoted on the plates 11 adjoining each of the slots 14 and the cover has a convexed portion 15 to permit the reciprocation of the lugs 10. The lugs 10, engaging in the convexed portions or recesses 15 of the members 13 serve to prevent the members 13 from swinging, an uncovering of the slots 14 being thereby avoided.

From the foregoing it will readily be seen that the rubber tire 9 will cause the wheel to run without noise, the springs 5 furnishing the resiliency.

The retaining plates 11 prevent any foreign matter from being admitted into the space A between the band 6 and the felly 3, and also retain the springs 5 against lateral displacement, as Fig. 2 will clearly show.

Having thus described my invention, what I claim as new and desire to secure by United States Letters Patent is:

In a wheel, a felly; a yieldable band surrounding the felly; a tire carried by the band; rigid side plates secured to the felly and provided with radial slots; lugs on the tire mounted to slide in the slots: closures for the slots pivoted to the side plates and provided with recesses receiving the lugs slidably, the lugs engaging in the recesses to prevent pivotal movement of the closures and a consequent uncovering of the slots; and springs abutting against the band and against the felly, the springs being engaged throughout their entire lengths by the side plates to prevent a buckling of the springs and to prevent a consequent withdrawal of the lugs from the recesses.

In testimony that I claim the foregoing as my own, I have hereto affixed my signature in the presence of two witnesses.

WILLIAM HALLINAN.

Witnesses:
    G. COOPER,
    M. M. WHEELER.

---

Copies of this patent may be obtained for five cents each, by addressing the "Commissioner of Patents, Washington, D. C."